United States Patent
Mayer et al.

(10) Patent No.: US 10,018,495 B2
(45) Date of Patent: Jul. 10, 2018

(54) RADAR-BASED FILL-LEVEL MEASURING DEVICE HAVING A SYNTHESIZER CIRCUIT

(71) Applicant: Endress + Hauser GmbH + Co. KG, Maulburg (DE)

(72) Inventors: Winfried Mayer, Buch (DE); Roland Grozinger, Neuenburg (DE); Qi Chen, Maulburg (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 223 days.

(21) Appl. No.: 14/649,042

(22) PCT Filed: Nov. 25, 2013

(86) PCT No.: PCT/EP2013/074572
§ 371 (c)(1),
(2) Date: Jun. 2, 2015

(87) PCT Pub. No.: WO2014/086606
PCT Pub. Date: Jun. 12, 2014

(65) Prior Publication Data
US 2015/0346015 A1    Dec. 3, 2015

(30) Foreign Application Priority Data
Dec. 5, 2012   (DE) .......................... 10 2012 111 839

(51) Int. Cl.
*G01F 23/284* (2006.01)

(52) U.S. Cl.
CPC ................. *G01F 23/284* (2013.01)

(58) Field of Classification Search
CPC ..... G01F 23/28; G01F 23/284; G01F 23/2845
(Continued)

(56) References Cited

U.S. PATENT DOCUMENTS

| 5,847,567 | A | 12/1998 | Kielb |
| 7,002,511 | B1 * | 2/2006 | Ammar ................... G01S 7/032 |
| | | | 342/118 |

(Continued)

FOREIGN PATENT DOCUMENTS

| CN | 1632475 A | 6/2005 |
| CN | 101517381 A | 8/2009 |

(Continued)

OTHER PUBLICATIONS

Detlef Brumbi: "Grundlagen der Radartechnik zur Fullstandmessung", Krohne Messtechnik GmbH + Co. KG, Jul. 1, 2003, Duisburg, Germany.

(Continued)

*Primary Examiner* — Daniel S Larkin
*Assistant Examiner* — Nathaniel Kolb
(74) *Attorney, Agent, or Firm* — Bacon & Thomas, PLLC

(57) ABSTRACT

A radar-based fill-level measuring device comprising at least one synthesizer circuit having a plurality of circuit components for producing phase controlled microwave signals for a travel-time measurement and at least three electrical potentials for supplying the synthesizer circuit, wherein the synthesizer circuit has at least three circuit groups. Each circuit component is associated with at least one circuit group, wherein each of the at least three circuit groups is fed by means of at least one potential difference between two of the at least three different potentials.

6 Claims, 4 Drawing Sheets

(58) Field of Classification Search
USPC .................................................. 73/290 V
See application file for complete search history.

(56) References Cited

U.S. PATENT DOCUMENTS

| | | | |
|---|---|---|---|
| 7,548,072 B2* | 6/2009 | Griessbaum | G01F 23/284 |
| | | | 324/636 |
| 7,605,748 B2 | 10/2009 | Fehrenbach | |
| 8,322,194 B2 | 12/2012 | Muller | |
| 8,884,632 B2 | 11/2014 | Klofer | |
| 2003/0139146 A1* | 7/2003 | Mercier | G01F 23/284 |
| | | | 455/73 |
| 2007/0176823 A1* | 8/2007 | Griessbaum | G01F 23/284 |
| | | | 342/175 |
| 2010/0262843 A1 | 10/2010 | Allgaier | |

FOREIGN PATENT DOCUMENTS

| | | |
|---|---|---|
| CN | 201562965 U | 8/2010 |
| DE | 102005058015 A1 | 6/2007 |
| DE | 102006015659 A1 | 8/2007 |
| DE | 102008050329 A1 | 4/2010 |

OTHER PUBLICATIONS

German Search Report, German PTO, Munich, DE, dated Jul. 23, 2013.
English Translation of the International Preliminary Report on Patentability, WIPO, Geneva, CH, dated Jun. 18, 2015.
International Search Report, EPO, The Netherlands, dated Feb. 13, 2014.

* cited by examiner

RADAR-BASED FILL-LEVEL MEASURING DEVICE HAVING A SYNTHESIZER CIRCUIT

TECHNICAL FIELD

The invention relates to a radar-based fill-level measuring device, comprising at least one synthesizer circuit having a plurality of circuit components for producing phase controlled microwave signals for a travel-time measurement.

BACKGROUND DISCUSSION

A known measuring method of the universe of measuring methods for ascertaining fill level in a container is the travel-time measuring method. In the case of this measuring method, microwaves, for example, are transmitted as measuring signals via an antenna apparatus and the echo waves reflected on the surface of the medium detected, wherein the travel time of the measuring signals is a measure for the separation between the antenna apparatus and the surface of the medium. From half the travel time, accordingly, the fill level of the medium in a container can be ascertained. The echo curve represents, in such case, the total course of the signal as a function of time, wherein each measured value of the echo curve corresponds to the amplitude of an echo signal reflected on a surface at a certain distance from the antenna. The travel time measuring method is essentially divided into two methods of ascertainment: in the case of the time-difference measurement, the time, which a broadband wave signal pulse requires for a traveled path, is ascertained. In the case of frequency modulated continuous wave radar (FMCW—Frequency Modulated Continuous Wave), the emitted, frequency modulated, high-frequency signal is compared to the reflected, received, frequency-modulated, high-frequency signal ascertained. In the following, no limitation to a particular method of ascertainment is intended.

For producing frequency—and phase stable signals, which are necessary for coherent methods in communications—and sensor technology, frequently synthesizer circuits are applied, which contain one or more phase control circuits.

In the state of the art are phase control loops with integrated phase control circuits, wherein the phase control circuits have, besides a phase detector, programmable frequency dividers. A part of an output signal of a voltage controlled oscillator is fed back into the phase control circuit and there after passing through a frequency divider compared with a reference signal (in given cases, also frequency divided) in the phase detector of the phase control circuit. The phase detector delivers as output signal of the phase control circuit an electrical current or a voltage, which is proportional to the phase difference between the input signal and the signal of the voltage controlled oscillator. This output signal is fed via a controller to the control input of the voltage controlled oscillator. In the case of correct design of the controller and the factors of the frequency divider, the output signal follows the phase and the frequency of the input signal. Through use of an input signal of high quality, then its good spectral characteristics can be transferred to the output signal. Moreover, the output signal follows frequency- and phase modulations of the input signal.

Sensors of process measurements technology should usually fulfill standards relative to explosion protection, so-called Ex-standards, in order that they can be operated in an environment containing an explosive atmosphere. These Ex-standards are easier to fulfill, the smaller are the maximum needed potential differences and electrical currents and the lower the supply voltages of the circuit components, respectively the circuit groups, and the smaller the number of voltage sources.

SUMMARY OF THE INVENTION

An object of the invention is to avoid the disadvantages of the state of the art and to provide a radar-based fill-level measuring device, which is safer and more efficient.

The object is achieved by the subject matter of the invention. This includes a radar-based fill-level measuring device, comprising at least one synthesizer circuit having a plurality of circuit components for producing phase controlled microwave signals for a travel-time measurement and having at least three electrical potentials for supplying the synthesizer circuit, wherein the synthesizer circuit has at least three circuit groups, wherein each circuit component is associated with at least one circuit group, wherein each of the at least three circuit groups is fed by means of at least one potential difference between two of the at least three different potentials.

The object of the invention is achieved according to the invention by features including that the circuit components of the synthesizer circuit are associated with at least three circuit groups with equal and/or different potential differences. If a circuit component needs greater than a potential difference, then this circuit component can be associated with a plurality of circuit groups. Furthermore, the circuit groups are preferably arranged in series, whereby the electrical currents are only half as large as in the case of a parallel arrangement of the circuit groups. Smaller electrical currents mean the synthesizer circuit is more efficient and safer in the vicinity of an explosive gas.

In a form of embodiment, the synthesizer circuit includes three circuit groups, wherein a first circuit group is fed by means of a first electrical potential difference, wherein the first potential difference is between a first potential and a second potential, wherein a second circuit group is fed by means of a second electrical potential difference, wherein the second potential difference is between a third potential and the second potential, wherein a third circuit group is fed by means of a third electrical potential difference, wherein the third potential difference is between the third potential and the first potential.

In a further development, the first circuit group has at least four circuit components, wherein the first circuit component is a voltage controlled oscillator, the second circuit component is a phase control circuit, the third circuit component is a first coupling element, and the fourth circuit component is a second coupling element.

In a further development, a third circuit group has at least a fifth circuit component, which is an active controller.

In a further development, the synthesizer circuit has a sixth circuit component, which is associated with both the first circuit group as a well as also the second circuit group and is a microwave circuit.

In a form of embodiment, the voltage controlled oscillator, the active controller and the phase control circuit are connected in series to form a phase control loop and the signal output of the phase control loop is connected with the first coupling element.

In a further development, the microwave circuit is connected input side with the first coupling element and output side with the second coupling element.

The first and second coupling elements can be embodied e.g. as capacitors, coupling capacitors, transformers and/or suitable line structures.

In a form of embodiment, at least one of the coupling elements and the microwave circuit are integrated on a microwave circuit card.

In a further development, the microwave circuit card is arranged on a support circuit card.

In a further development, the microwave circuit card includes a ground plane, wherein the ground plane considered from the support circuit card is arranged on an oppositely lying side of the microwave circuit card.

In an additional form of embodiment, the fill-level measuring device includes a power supply circuit for producing the at least three electrical potentials, wherein the power supply circuit has at least one control system, and the at least one control system includes at least a first and/or a second variable electrical current source for maintaining at least one of the potential differences between two of the at least three different potentials in the case of changing electrical currents of the circuit components, respectively different electrical currents of the circuit groups.

An object of the invention is most efficiently achieved, when approximately the same electrical current flows through each circuit group. In order to hold the potential differences during the supplying of the circuit groups as constant as possible, small differences in the currents are cancelled by means of the control system of the power supply circuit.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
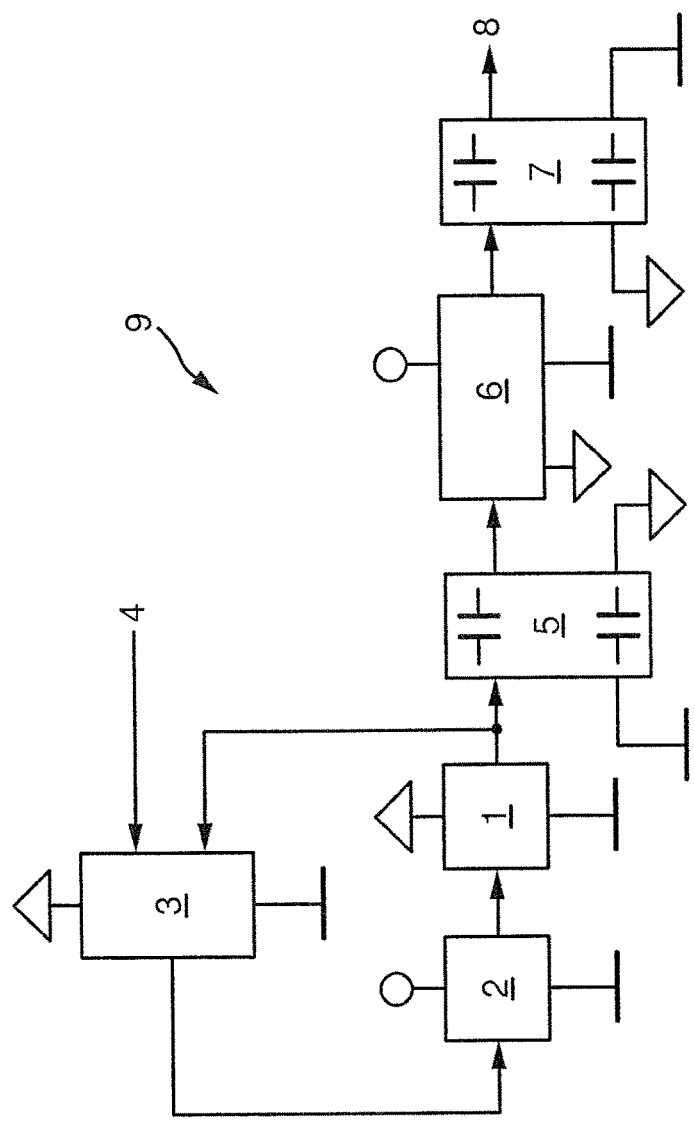
FIG. 1 is a synthesizer circuit with coupling elements.

FIG. 1 shows a synthesizer circuit 9 composed of a number of circuit components. One of the circuit components is a phase control circuit 3, which has a first signal input 4, wherein the first signal input 4 of the phase control circuit 3 is simultaneously the signal input 4 of the synthesizer circuit 9. The phase control circuit 3 is connected to be supplied with a first potential M, as represented by the triangle, and a second potential G, as represented by the inverted T. The phase control circuit 3 is thus fed by a first potential difference MG. The signal output the phase control circuit 3 is connected with an active controller 2. The active controller 2 is connected to be supplied with a third potential P, as represented by the circle, and the second potential G in such a way that the active controller 2 is fed by a second potential difference PG. A signal output of the active controller 2 is connected with a signal input of a voltage controlled oscillator 1. The voltage controlled oscillator 1 is connected to be supplied with the first potential M and the second potential G in such a way that the voltage controlled oscillator 1 is fed from the first potential difference MG. A signal output of the voltage controlled oscillator 1 is connected with a second signal input of the phase control circuit 3.

The signal output of the voltage controlled oscillator 1 is also connected with a signal input of a first coupling element 5. A signal output of the first coupling element 5 is connected with a signal input of a frequency multiplying microwave circuit 6. The microwave circuit 6 is connected to be supplied both with the first potential M as well as also with the second potential G and the third potential P. The means that the microwave circuit 6 is fed both by the first potential difference MG as well as also by the second potential difference PG. A signal output of the microwave circuit 6 is connected with a signal input of a second coupling element 7. A signal output 8 of the coupling element 7 represents simultaneously the signal output 8 of the synthesizer circuit. The first and second coupling elements 5, 7 are each associated with the first potential difference MG in such a way that in the case of a high-frequency signal the first and second coupling elements 5, 7 short circuit the first potential M with the second potential G.

Figure 2:
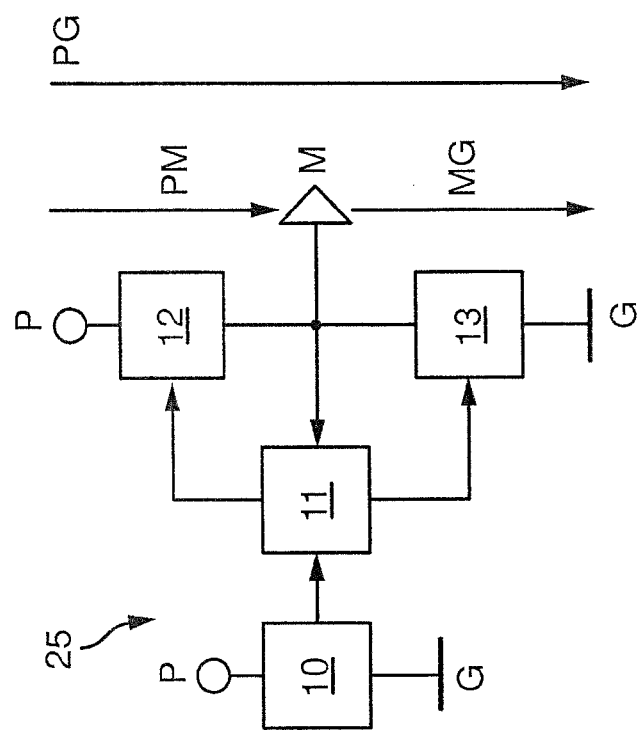
FIG. 2 is a power supply circuit for the synthesizer circuit.

Furthermore, the fill-level measuring device includes a power supply circuit 25 (see FIG. 2) for producing the first, second and third potentials M, G, P. Power supply circuit 25 includes input side a potential reference 10 and a control system 11, which are connected to the third potential P and the second potential G. A reference voltage produced in the potential reference, e.g. by a voltage reference component or a voltage divider, is applied to a first input of the control system 11. The outputs of the control system 11 are connected with first and second variable electrical current sources 12, 13, which are so connected in series that the first variable electrical current source 12 is connected with the third potential P and the second variable electrical current source 13 is connected with the second potential G and the series-connected first and second variable electrical current sources 12, 13 are fed by the second potential difference PG. A second input of the control system 11 is connected with a connecting line between the first and second variable electrical current sources 12, 13, wherein the connecting line between the first and second variable electrical current sources 12, 13, which is likewise connected with the control system 11, defines the first potential M.

The control system 11 holds the potential M fixed at a constant level between the potentials P and G. For this, the control system 11 balances with the first variable electrical current source 12, respectively with the second variable electrical current source 13, different electrical currents, which flow between the third and the second potentials P, G, respectively between the first and the second potentials M, G. If circuit components in the circuit groups between the potentials PM and MG require slightly smaller potential differences, these can be produced by linear regulators with little voltage drop (low drop regulators) and/or series resistances installed locally within the circuit groups. Because the potential differences are small, the associated losses in electrical power are negligible.

Figure 3:
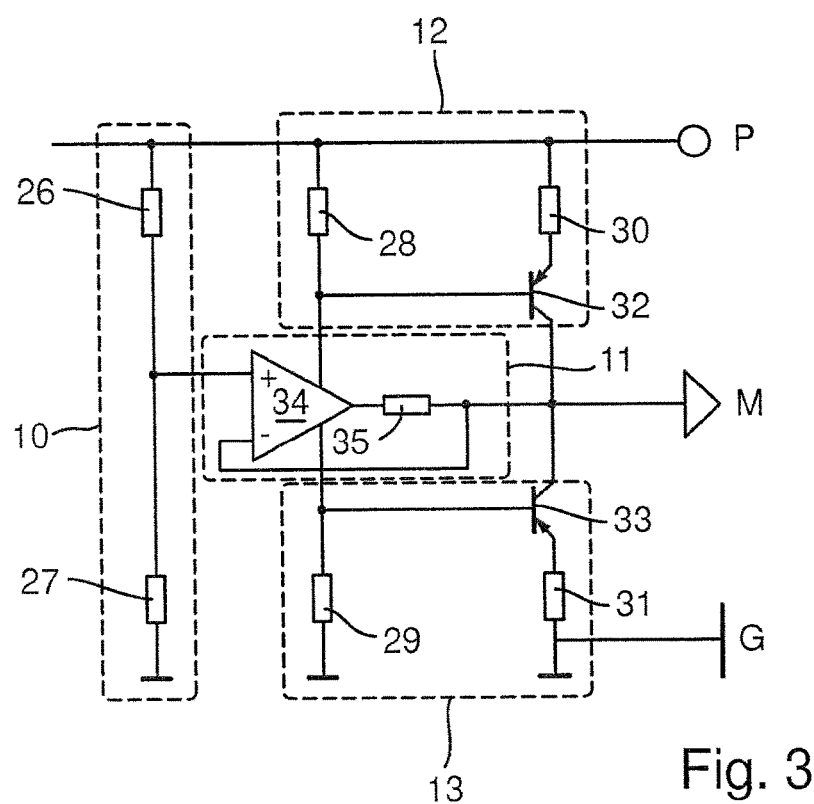
FIG. 3 is a concrete example of an embodiment of the power supply circuit.

FIG. 3 shows a form of embodiment of the power supply circuit 25. Extending from the third potential P is a voltage divider in the form of first and second resistors 26, 27, which are connected in series to the second potential G. This voltage divider represents the potential reference 10.

Connected to the center tap of this voltage divider between the first and second resistors 26, 27 is the positive input of a non-inverting operational amplifier 34. An output of the operational amplifier 34 is connected via a seventh resistor 35 with a negative input of the operational amplifier 34. The operational amplifier 34 forms together with the seventh resistor 35 the control system 11, wherein the negative input of the operational amplifier 34 defines the first potential M.

A positive power supply connection of the operational amplifier 34 is connected via a third resistor 28 with the third potential P, and a negative power supply connection of the operational amplifier 34 is connected via a fourth resistor 29 with the second potential G. The positive power supply connection of the operational amplifier 34 is likewise connected with the base of a first PNP transistor 32, wherein the emitter of the first PNP transistor 32 is connected via a fifth resistor 30 with the third potential P. The third resistor 28 forms together with the first PNP transistor 32 and the fifth resistor 30 the first variable electrical current source 12.

The negative power supply connection of the operational amplifier 34 is connected via a fourth resistor 29 with the second potential G. The negative power supply connection of the operational amplifier 34 is connected with the base of a second PNP transistor 33, wherein the emitter of the second PNP transistor 33 is connected via a sixth resistor 31 with the second potential G. The fourth resistor 29 forms together with the second PNP transistor 33 and the sixth resistor 31 the second variable electrical current source 13.

The collector of the first PNP transistor 32 is connected with the collector of the second PNP transistor 33, wherein this connecting line is connected with the negative input of the operational amplifier 34 as well as also represents the first potential M.

Figure 4A:
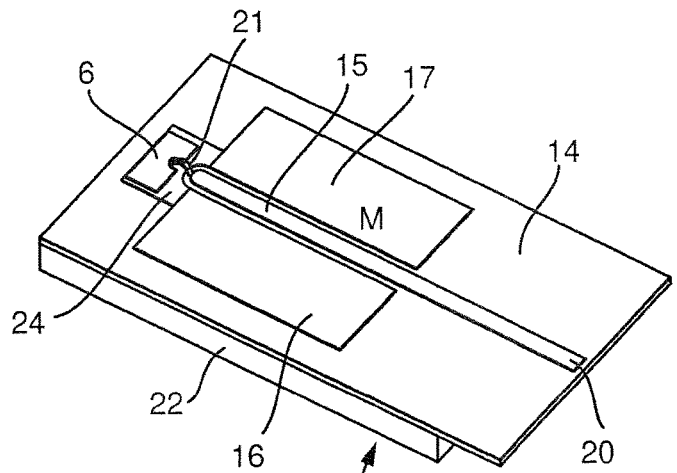
FIGS. 4a-4c is a concrete example of an embodiment of the coupling element.
Figure 4B:
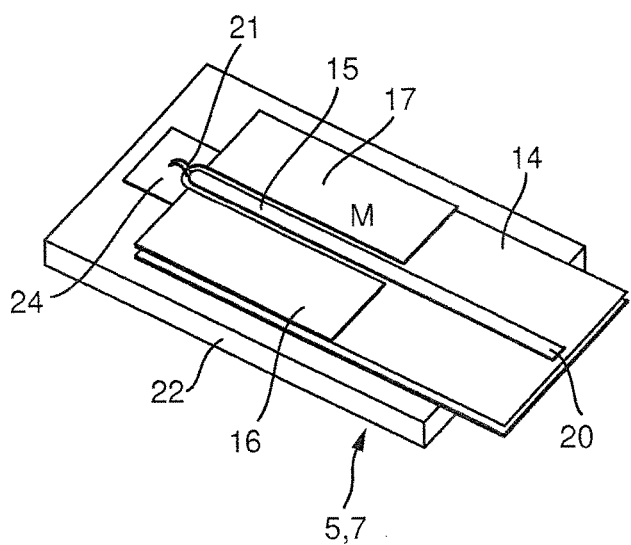
Figure 4C:
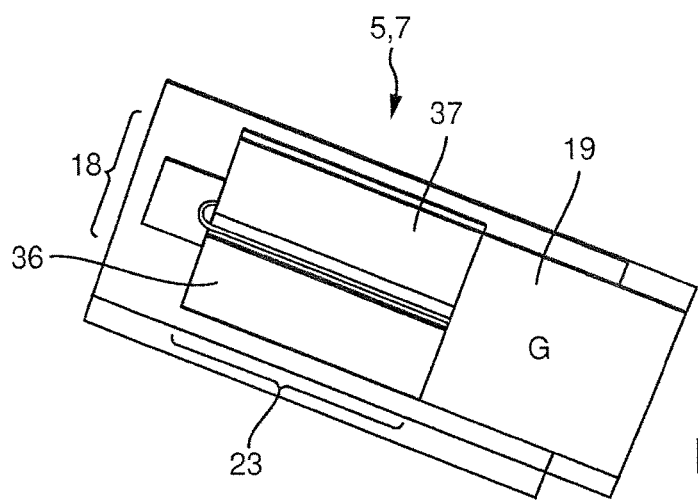

FIGS. 4a-c show an advantageous embodiment of the first and/or second coupling element 5,7, such as is applied frequently in microstrip conductor technology.

A microwave circuit card 14 forms the basis for the first and/or second coupling elements 5, 7. Microwave circuit card 14 includes a first and a second surface, wherein arranged on the first surface is a rectangular potential surface 24, which is connected with the microwave circuit 6 and represents the potential M. The high-frequency in- or output signal of the microwave circuit 6 is led by means of bonding wires 21, housing pins or wires to a stripline 15. The stripline 15 is elongated, wherein the bonding wires 21 are connected with a shorter side of the stripline 15. Arranged on the first surface of the microwave circuit card 14 opposite the two elongated sides of the stripline 15 are first and second rectangular coupling surfaces 16, 17.

The second surface of the microwave circuit card 14 is for reasons of stability arranged on a support circuit card 22. Arranged on a side of the microwave circuit card 14 lying opposite the support circuit card 22 are third and fourth coupling surfaces 36, 37, which lie opposite the first and second coupling surfaces 16, 17 (see FIG. 4c). A traversing ground plane 19 connects the third and the fourth coupling surface 36, 37 on the support circuit card 22, wherein the ground plane 19 carries the second potential G.

On the first surface of the microwave circuit card 14, the stripline 15 has on an end lying opposite the bonding wires 21 a microstrip conductor gate 20. Defined by first, second, third and fourth coupling surface 16, 17, 36, 37, which are pairwise oppositely lying and enclose the support circuit card 22 and the microwave circuit card 14, is a coupling zone 18 with a coupling length 23. The coupling zone 18 effects that DC currents are isolated by the insulating microwave circuit card 14 and the first and second potentials M, G are short circuited with one another by a lambda/4 coupled line for high-frequency signals of the microwave circuit 6.

By a suitable dimensioning of the impedances and the lengths of the first, second, third and fourth coupling surfaces 16, 17, 36 37, the HF-signal is transferred with low loss—and reflection to the microstrip transmission line 20.

An isolating of the DC currents between the signal input and the signal output of the microwave circuit 6 can, in case it is not already implemented by internal capacitances in the microwave in circuit 6, likewise occur by coupled line or by joining a concentrated component, such as a series capacitor, into the stripline 15.

The circuit of the invention, as shown in the figures, functions in the following way:

First, the circuit components, which are associated with the first potential difference MG, are connected to the first and second potentials M, G of the power supply circuit 25. These are four circuit components: The voltage controlled oscillator 1, the phase control circuit 3, and the first and second coupling elements 5, 7. These circuit components form the first circuit group.

Next, the circuit components, which are fed from the second potential difference PG, are connected to the third potential P and the second potential G. This affects in this example of an embodiment only one circuit component, namely the active controller 2. This circuit component forms the second circuit group.

The microwave circuit 6 is fed by the first and the second potential differences MG, PG. As a result, the microwave circuit 6 is connected to the first, the second and the third potentials M, G, P. The microwave circuit 6 is in this example of an embodiment the only circuit component, which is associated both with the first as well as also with the second circuit group.

One could imagine a third circuit group fed from a third potential difference PM. The circuit components associated with the third circuit group would be connected with the first and third potentials M, P.

The operation of the phase control circuit 3 in combination with the active controller 2 and the voltage controlled oscillator 1 for producing phase controlled microwave signals is known from the state of the art and was already explained in the introduction of the description. Since the signal was converted into a phase controlled signal by means of the phase control circuit 3, which active controller 2 and the voltage controlled oscillator 1, the phase controlled signal is transmitted via the first coupling element 5 to the frequency multiplying microwave circuit 6. The microwave circuit 6 multiplies the frequency of the phase controlled signal by a certain integer factor, which amounts to 6 in this example of an embodiment. In this way, the frequency of the phase controlled signal, for example, 13 GHz at the start, is increased to 78 GHz. Then, the frequency multiplied, phase controlled signal is transmitted via the second coupling element 7 to the signal output 8 of the synthesizer circuit 9.

The invention claimed is:

1. A radar-based fill-level measuring device, comprising:
at least one synthesizer circuit having a plurality of circuit components for producing phase-controlled microwave signals for a travel-time measurement; and comprising a power supply circuit for producing at least first, second, and third electrical potentials for supplying said at least one synthesizer circuit, wherein:
said at least one synthesizer circuit has three circuit groups;
each of said circuit components is associated with at least one circuit group;
the first circuit group is fed by means of a first electrical potential difference, wherein the first potential difference is between the first potential and the second potential;

the second circuit group is fed by means of a second electrical potential difference, wherein the second potential difference is between the third potential and the second potential;

the third circuit group is fed by means of a third electrical potential difference, wherein the third potential difference is between the third potential and the first potential;

the first circuit group has at least four circuit components;

the first circuit component is a voltage controlled oscillator;

the second circuit component is a phase control circuit;

the third circuit component is a first coupling element;

the fourth circuit component is a second coupling element;

the second circuit group has at least a fifth circuit component, which is an active controller; the voltage controlled oscillator, the active controller and the phase control circuit are connected to form a phase control loop and the output of the phase control loop is connected with the first coupling element; and a sixth circuit component is associated with both the second circuit group as well as the third circuit group and is a microwave circuit; said microwave circuit is connected input side with the first coupling element.

2. The radar-based fill-level measuring device as claimed in claim 1, wherein:

said microwave circuit is connected at the output side with said second coupling element.

3. The radar-based fill-level measuring device as claimed in claim 1, wherein:

at least one of the coupling elements and said microwave circuit are integrated on a microwave circuit card.

4. The fill-level measuring device as claimed in claim 3, wherein:

said microwave circuit card is arranged on a support circuit card.

5. The radar-based fill-level measuring device as claimed in claim 4, wherein:

said microwave circuit card includes a ground plane; and said ground plane considered from said support circuit card is arranged on an oppositely lying side of said microwave circuit card.

6. The radar-based fill-level measuring device as claimed in claim 1, wherein:

said power supply circuit has at least one control system, and said at least one control system includes at least a first and/or a second variable electrical current source for maintaining at least one of the potential differences between two of said at least first, second, and third electrical potentials in the case of changing electrical currents of said circuit components, respectively different electrical currents of said circuit groups.

* * * * *